(12) United States Patent
Smith et al.

(10) Patent No.: US 7,513,146 B2
(45) Date of Patent: Apr. 7, 2009

(54) VEHICLE WIND TUNNEL BALANCE

(75) Inventors: Donald G. Smith, Portland, OR (US);
Bruno Banceu, Vancouver, WA (US);
Matthew G. Markstaller, West Linn, OR (US)

(73) Assignee: Daimler Trucks North America LLC, Portland, OR (US)

( * ) Notice: Subject to any disclaimer, the term of this patent is extended or adjusted under 35 U.S.C. 154(b) by 35 days.

(21) Appl. No.: 11/788,361

(22) Filed: Apr. 18, 2007

(65) Prior Publication Data
US 2007/0295883 A1    Dec. 27, 2007

Related U.S. Application Data

(60) Provisional application No. 60/796,786, filed on May 1, 2006.

(51) Int. Cl.
*G01M 9/00* (2006.01)
(52) U.S. Cl. ...................................................... 73/147
(58) Field of Classification Search ..................... 73/147
See application file for complete search history.

(56) References Cited

U.S. PATENT DOCUMENTS

| | | | |
|---|---|---|---|
| 3,827,289 A | 8/1974 | Borg | |
| 4,073,188 A | 2/1978 | Slezinger et al. | |
| 4,308,748 A | 1/1982 | Jacocks | |
| 4,735,085 A | 4/1988 | Meyer | |
| 4,750,355 A | 6/1988 | Urabe et al. | |
| 4,751,844 A | 6/1988 | Matsushita | |
| 4,798,088 A | 1/1989 | Haeg | |
| 4,843,873 A * | 7/1989 | Harald et al. | 73/147 |
| 4,987,542 A | 1/1991 | Tran | |
| 5,035,359 A * | 7/1991 | Yamada et al. | 239/502 |
| 5,048,342 A | 9/1991 | Morelli | |
| 5,119,673 A | 6/1992 | Tran et al. | |

(Continued)

OTHER PUBLICATIONS

Oran W. Nicks, Low Speed Wind Tunnel Facility Handbook, Texas Engineering Experiment Station, Sep. 2000.
Office Action from the U.S. Patent and Trademark Office, for U.S. Appl. No. 10/003,169, dated Aug. 29, 2002. U.S. Appl. No. 10/003,169 issued as U.S. Patent 6,820,477.

(Continued)

*Primary Examiner*—Andre J Allen
*Assistant Examiner*—Jermaine Jenkins
(74) *Attorney, Agent, or Firm*—Klarquist Sparkman, LLP (57) ABSTRACT

A vehicle supporting platform can be supported at plural locations (e.g., four locations) from below such that the platform can pivot fore to aft and side to side in response to the impact of wind on a vehicle on the platform. In a desirable form, the platform is suspended by four suspension rods or cables that loosely support the respective corners of a platform supporting structure. The platform supporting structure can be positioned in a bay beneath the floor level. Although a different number of sensors can be used, in one approach there is one aft motion sensor coupled to the front of the floor supporting frame and a wall portion of the bay and two side sensors, one adjacent to the front of the platform and the other adjacent to the rear of the platform. Both of the side sensors can be on the same side of the platform. A double ball joint can be used to couple the sensor to the structure in one embodiment to eliminate off axis loading. A structure such as a locking collar arrangement can be used in an embodiment to facilitate disconnecting the sensor from the platform.

28 Claims, 5 Drawing Sheets

U.S. PATENT DOCUMENTS

| | | | |
|---|---|---|---|
| 5,315,868 A | | 5/1994 | Jacobi et al. |
| 5,495,754 A | | 3/1996 | Starr, Jr. et al. |
| 5,501,101 A | * | 3/1996 | Purcell ........................ 73/147 |
| 5,753,865 A | | 5/1998 | Lechtman |
| 6,327,526 B1 | | 12/2001 | Hagan |
| 6,564,626 B2 | | 5/2003 | Ulman et al. |
| 6,615,652 B1 | | 9/2003 | Bechstein et al. |
| 6,820,477 B2 | | 11/2004 | Markstaller et al. |
| 6,997,049 B2 | * | 2/2006 | Lacey, Jr. .................... 73/147 |
| 7,107,831 B2 | | 9/2006 | Markstaller et al. |

OTHER PUBLICATIONS

Office Action from the U.S. Patent and Trademark Office, for U.S. Appl. No. 10/003,169, dated Mar. 5, 2003. U.S. Appl. No. 10/003,169 issued as U.S. Patent 6,820,477.

Office Action from the U.S. Patent and Trademark Office, for U.S. Appl. No. 10/003,169, dated May 19, 2004. U.S. Appl. No. 10/003,169 issued as U.S. Patent 6,820,477.

Office Action from the U.S. Patent and Trademark Office, for U.S. Appl. No. 10/996,734, dated Sep. 7, 2005. U.S. Appl. No. 10/966,734 issued as U.S. Patent 7,107,831.

* cited by examiner

VEHICLE WIND TUNNEL BALANCE

CROSS REFERENCE TO RELATED APPLICATIONS

This application claims the benefit U.S. Provisional Patent Application No. 60/796,786, filed May 1, 2006.

SUMMARY

In accordance with certain aspects, a vehicle supporting platform can be supported at plural locations (e.g., four locations) from below such that the platform can pivot fore to aft and side to side in response to the impact of wind on a vehicle on the platform. In a desirable form, the platform is suspended by four suspension rods or cables that loosely support the respective corners of a platform supporting structure. The platform supporting structure can be positioned in a bay beneath the floor level. Although a different number of sensors can be used, in one approach there is one aft motion sensor coupled to the front of the floor supporting frame and a wall portion of the bay and two side sensors, one adjacent to the front of the platform and the other adjacent to the rear of the platform. Both of the side sensors can be on the same side of the platform. A double ball joint can be used to couple the sensor to the structure in one embodiment to eliminate off axis loading. A structure such as a locking collar arrangement can be used in an embodiment to facilitate disconnecting the sensor from the platform.

TECHNICAL FIELD

The technology disclosed herein relates to wind tunnel balances for use in measuring aerodynamic forces and for supporting a vehicle, such as a truck, during wind tunnel testing.

DETAILED DESCRIPTION

Figure 1:
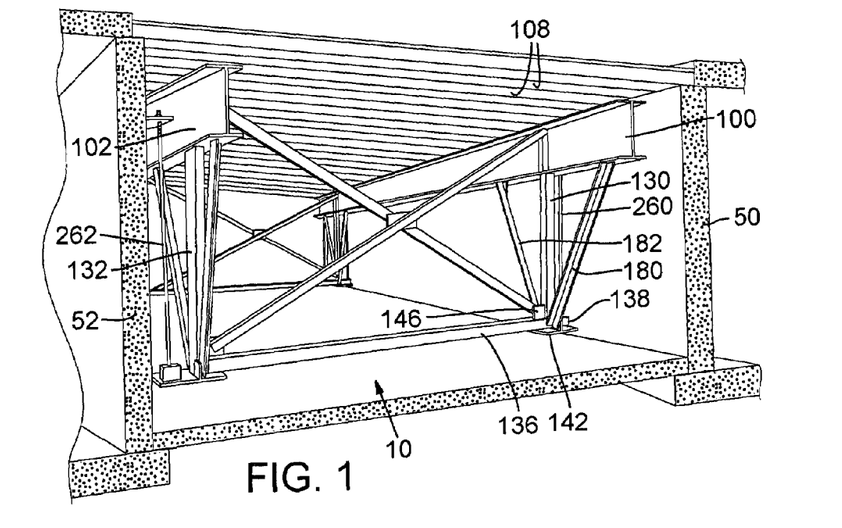
FIG. 1 is a perspective view of exemplary support structure for one embodiment of a vehicle wind tunnel balance.
Figure 2:
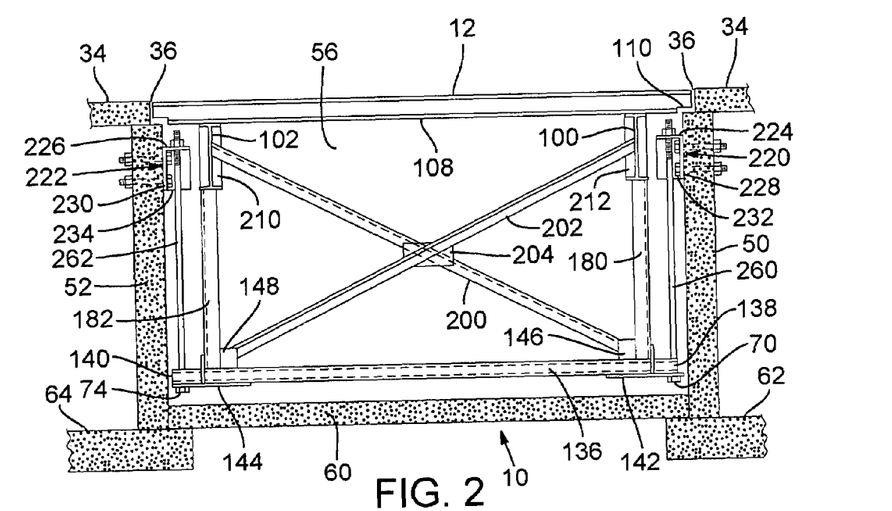
FIG. 2 is an end view of the embodiment of FIG. 1.
Figure 3:
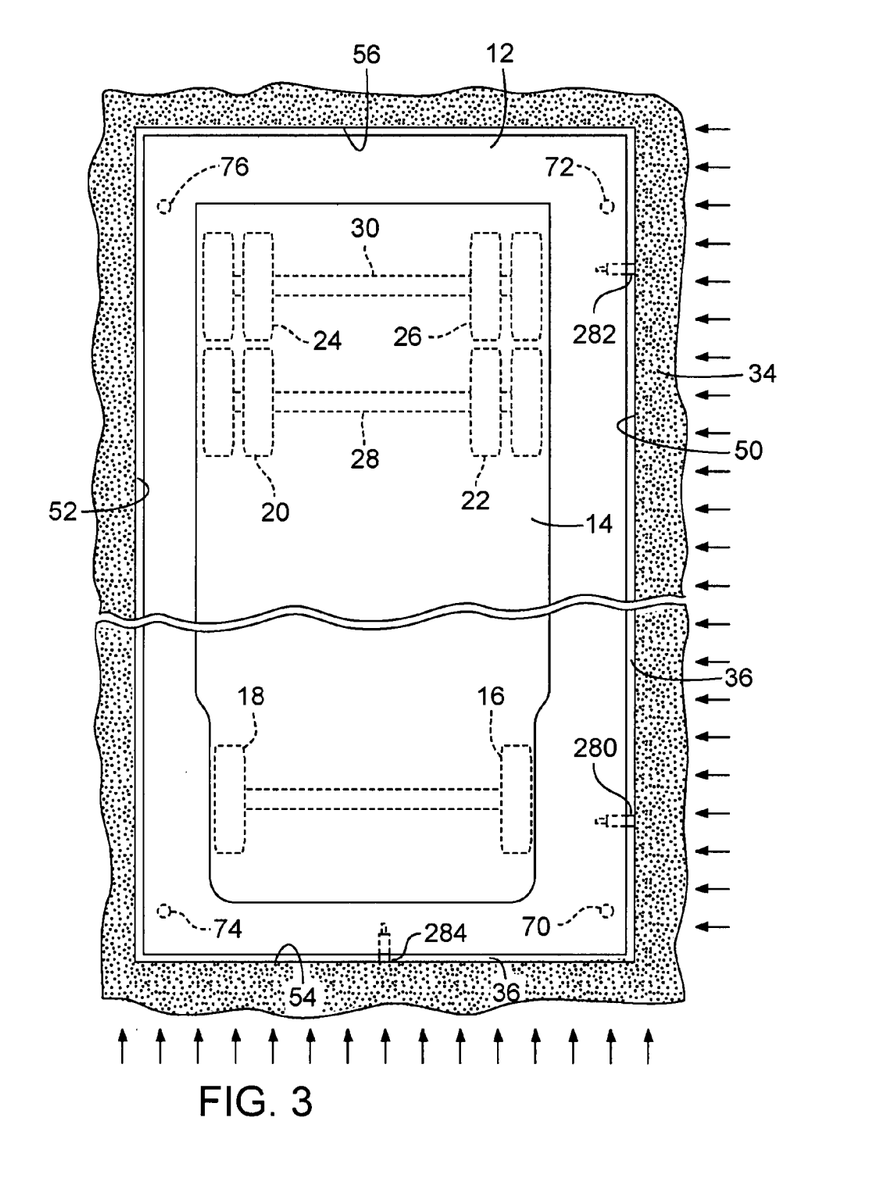
FIG. 3 is a top view of a wind tunnel balance with a vehicle shown schematically on a support surface of the wind tunnel balance.

With reference to FIGS. 1 through 4, an exemplary form of wind tunnel balance for vehicles in accordance with this disclosure is shown. In this example, a supporting frame structure, such as a frame 10, carries a vehicle supporting surface 12 which is desirably has a planar upper surface and can be formed of, for example, sheets of ⅝ inch aluminum decking secured to a frame. An exemplary balance deck 12 is sized to support heavy duty trucks with an exemplary dimension being 12'×30'. FIG. 3 illustrates a schematic version of a truck 14 having front wheels 16,18 and sets of rear wheels 20,22,24 and 26 coupled to respective tandem axles 28,30. Desirably, deck 12 is substantially flush with or in the plane of a floor portion of the wind tunnel 34 that is spaced from the deck by a perimeter gap 36. The wind tunnel is provided with a frame receiving under floor level bay within which the frame 10 is positioned. The illustrated bay comprises first and second spaced apart parallel upright side walls 50,52, front and rear walls 54,56, and a floor 60. The walls 50,52 are supported by respective footings 62,64.

The frame 10 supports the deck 12 so as to float (move fore and aft, side-to-side and twist) relative to the floor and within the gap 36 in response to forces applied by wind impacting a vehicle positioned on the deck. In accordance with this disclosure, a four point pendulum support approach is used. With reference to FIG. 3, and as will be more apparent from the discussion below, the frame 10 is suspended at four locations 70,72,74 and 76. Desirably, elongated supports coupled to walls of the bay are used to hang the frame at the respective locations 70,72,74 and 76. As a specific approach, four elongated rods are utilized to suspend the frame, each rod having an upper end coupled by a bracket mounted to one of the walls and a lower end coupled to the frame.

The illustrated frame 10 comprises first and second parallel spaced apart longitudinally extending supports, such as I-beams 100,102. In addition, spaced apart lateral or transversely extending deck supports, such as beams 108, are carried by the respective I-beams 100,102 with the deck 12 being positioned on top of the supports 108. The supports 108 desirably comprise I-beams at two foot intervals along the length of the longitudinally extending beams 100,102. The outermost ends of the supports 108, as indicated for one such end 110, are notched at their underside to provide a clearance gap above the upper end of the associated side wall (e.g., wall 50). As can be seen in FIG. 2, the ends of support 108 overlap the respective upper ends of the walls 50,52. In the event the frame 10 were to fail, or become overloaded, the walls 50,52 would prevent the deck 12 from falling into the bay.

A first suspension structure is provided to support the front end portions of beams 100,102 and a similar second rear suspension structure is used to support the rear end portions of the beams 100,102. The suspension structures can be identical and for this reason only the front suspension structure will be described.

Figure 4:
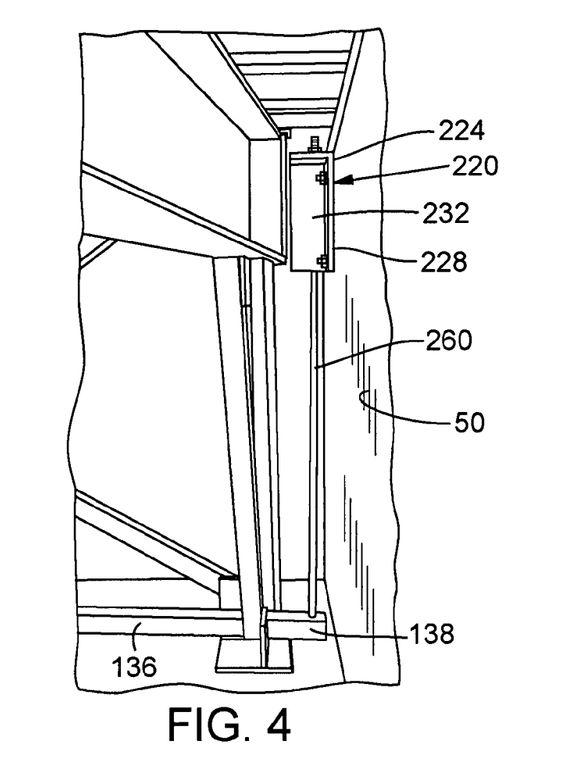
FIG. 4 is a closeup view of one of a plurality of supports utilized to suspend the wind tunnel balance from a wall of an underground bay within which the wind tunnel balance support structure is positioned.

More specifically, with reference to FIGS. 1, 2 and 4, the illustrated front suspension structure comprises first and second upright, in this case vertical, supports 130,132. Supports 130,132 can, for example, be box beams of tempered steel that are 4"×4" wide by ⅜" thick, although these dimensions and material can be varied. A cross member 136, which can be of the same material as uprights 130,132, extends across the lower portion of the suspension structure with outer end portions 138,140 of cross member 136 extending transversely beyond the lower ends of the respective uprights. Respective connectors, such as base plates 142,144, are positioned underneath the respective end portions of cross member 136 and the lower end portions of the respective supports 130,132. Respective upright connectors, such as gusset plates 146,148, extend upwardly from the respective plates 142,144. In this example, the gusset 146 is positioned against the front surface of upright 130 and the rear surface of cross member 136 and the gusset 148 is positioned against the upper surface of upright 132 and the rear surface of cross member 136. These components can be secured together, such as by welding, to provide a rigid interconnected structure. Upwardly angled front and rear braces or reinforcements 180,182 can be secured at the lower ends to the structure including gusset plate 142 and at their upper ends to the undersurface of beam 100. Gussets can also be used to assist in securing the upper ends of the braces 180,182 to the I-beam 100. One such gusset is shown at the upper end of support 182 in FIG. 1. Similar braces can also be positioned for connection from the structure including gusset 144 to I-beam 102. Supports 180,182 can, for example, be angle beams.

Respective cross supports are also included in the front suspension structure of this example. These cross supports can comprise respective cross members 200,202, such as angle beams. Cross members 200,202 are desirably secured together at their intersection, such as by welding to a connection plate or gusset 204. The lower end portion of cross member 200 is secured, as by welding, to gusset 146 and the upper end portion of cross member 200 is secured, as by welding, to a reinforcing gusset 210 mounted to I-beam 200. In the same manner, the lower end portion of cross member 202 is secured, as by welding, to gusset 148 and the upper end portion of cross member 202 is secured, as by welding, to a gusset 212 mounted to I-beam 100. It should be noted, however, that other connection approaches and support structures can be used. The illustrated structure does provide a desirable rigid framework for supporting the deck 12.

As previously mentioned, the frame 10 and thus the deck 12 is supported so as to float within the bay during normal operation of the wind tunnel balance. This floating support is accomplished by four elongated supports, such as cables or rods suspending the structure from components forming the bay. In the specifically illustrated approach, both the front and rear suspension structures are supported in the same manner. Therefore, only the front support approach of this example will be described. With reference to FIGS. 2 and 4, respective wall mounted brackets 220,222 are bolted or otherwise mounted to the side walls 50,52 of the bay. These brackets each comprise a respective upright horizontally extending support flange 224,226 and a respective wall mounting flange 228,230. Wall mounting flange 228 abuts the surface of wall 50 whereas wall mounting flange 230 abuts the surface of wall 52 in this example. Each of the brackets 220,222 also comprises a respective upright reinforcing flange 232,234. A first rod 260, which may be threaded along its length, has its upper end portion inserted through an opening in flange 224 with one or more nuts being secured to the rod at its upper end to prevent the rod from passing downwardly through the bracket. The lower end of rod 260 extends through an opening in gusset 142 and is secured from below by one or more nuts. A similar rod 262 is secured in the same manner to bracket flange 226 and the gusset 144. With four such support rods being provided, two at the front and two at the rear for suspending the respective front and rear support structures and thereby the deck, the deck is floatingly supported at the four locations 70,72,74 and 76 (see FIG. 3) to allow movement of the deck within limits in response to wind impacting a truck positioned on the deck in the wind tunnel.

Respective locking pins (shown schematically at 297 in FIG. 5) may be inserted through openings in the deck and into brackets (shown schematically at 299 in FIG. 5) coupled to the walls to prevent the deck from shifting at selected times, such as when the wind tunnel balance is not in use.

Desirably, the gap 36 is uniform and a uniform clearance is provided from the platform to the pit (such as ¼" clearance). Exemplary support rods 260,262 are ⅝" threaded support rods.

Figure 5:
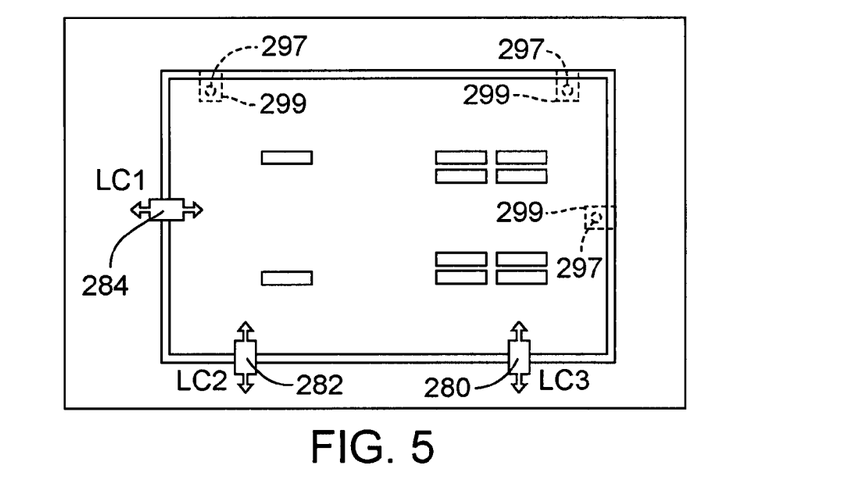
FIG. 5 is a schematic view illustrating an exemplary positioning of a truck on the upper surface of the wind tunnel balance and illustrating an exemplary positioning of load cells used to measure forces arising from wind directed toward the truck when positioned on the balance in a wind tunnel.
Figure 6:
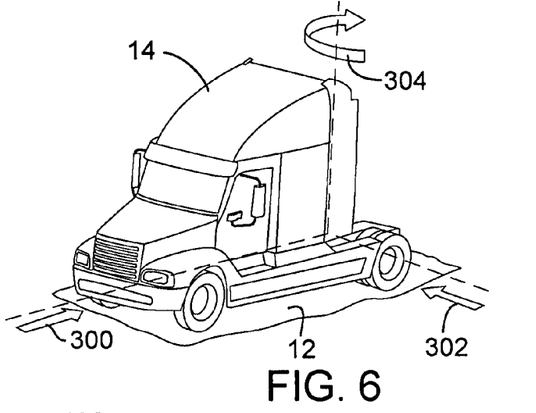
FIG. 6 schematically illustrates forces on a truck subjected to wind when on the wind tunnel balance.

A plurality of load cells couple the framework to the adjacent walls of the bay. Although any number of load cells can be used, desirably three such load cells are employed. With reference to FIGS. 3 and 5, two of the load cells 280,282 are positioned between wall 50 and the frame at respective fore and aft locations along the wall. In addition, a load cell 284 is positioned at the front of the structure extending between wall 54 and the frame and positioned along the longitudinal center of the wind tunnel balance. These load cells can be of any suitable type with a specific example being strain gauge containing load cells that provide an electrical signal indicative of the force detected by the load cell. A specific exemplary load cell is a Honeywell Model No. 41 Sensotech Precision Pancake load cell. These load cells can be used to determine drag, side forces and yawing moments in response to wind directed against a vehicle in the wind tunnel. For example, with reference to FIG. 6, drag corresponds to forces in the direction of arrow 300 in response to wind impacting the vehicle, side forces correspond to forces in the direction of arrow 302 in response to side directed wind components, and the yawing moment corresponds to twisting forces in the direction indicated by arrow 304. Forces measured by the load cells are used to compute drag, side forces and yawing moments in response to wind impacting the vehicle in the wind tunnel.

Figure 7:
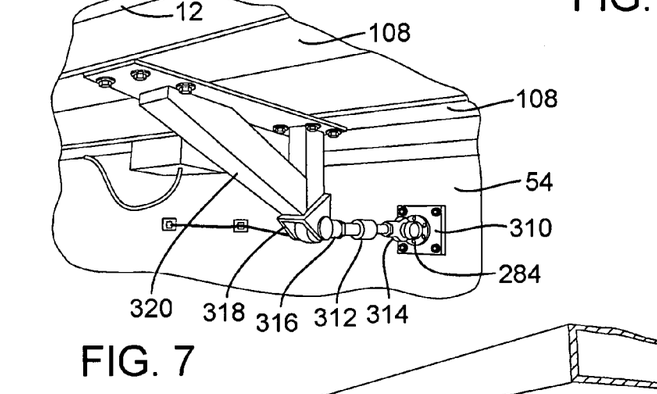
FIGS. 7 and 8 illustrate exemplary mounting assemblies.
Figure 8:
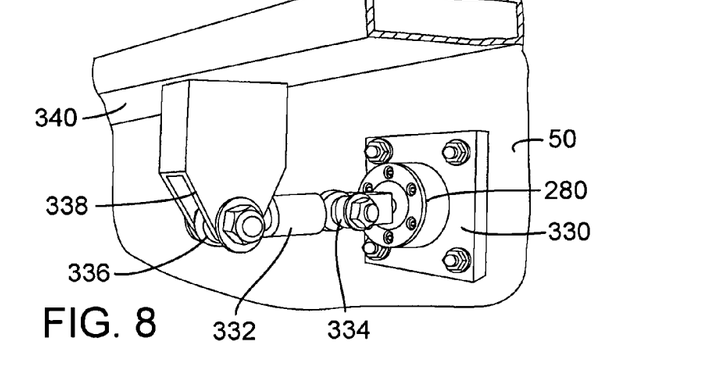
Figure 9:
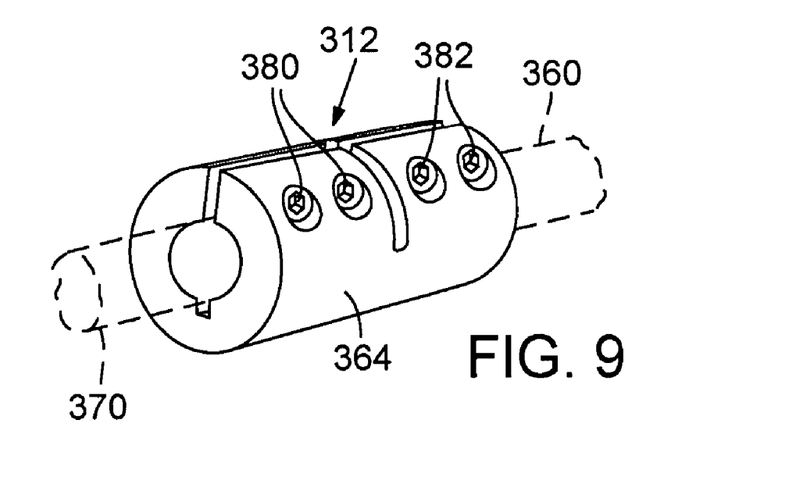
FIGS. 9 and 10 illustrate an example of a coupling that can be used with one form of a load cell mounting structure to permit decoupling of the load cell from the wind tunnel balance supporting framework.
Figure 10:
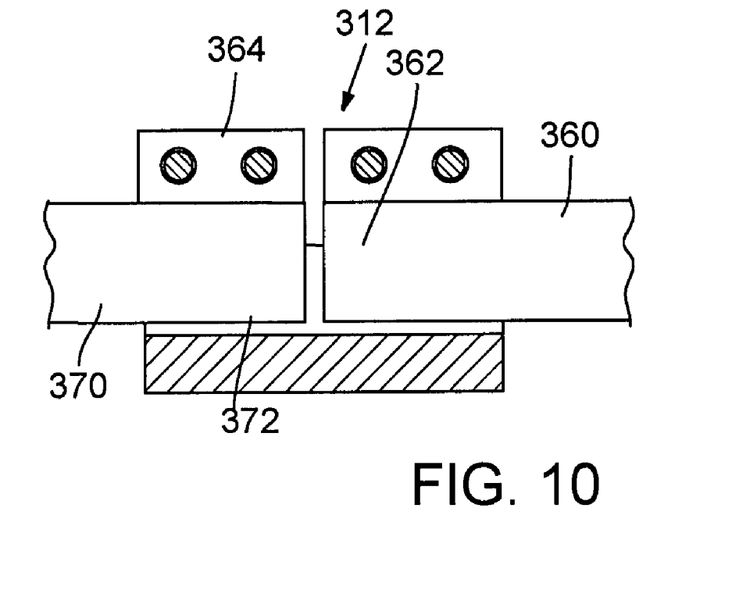

With reference to FIGS. 7-10, exemplary load cell coupling structures are illustrated. In FIG. 7, the load cell 284 is shown coupled to a mounting block 310 that is mounted to wall 54. A rod structure 312 is coupled at one end 314 by a ball joint to the load cell and at the opposite end 316 by another bolt ball joint to a clevis support 318. Support 318 is mounted by a support structure 320 to the undersurface of two of the cross beams 108. In addition, with reference to FIG. 8, the load cell 280 is mounted by a support 330 to the wall 350. A coupling rod structure 332 is coupled at a first end portion by a ball joint 334 to the load cell 280 and at a second end portion 336 by a ball joint to a clevis structure 338 mounted to a cross piece 340. Cross piece 340 is coupled to one of the I-beams 108 (not shown in FIG. 8). The use of double ball joints to connect the respective ends of the support pin structures to their associated load cells and mounting brackets eliminates off-axis loading of the load cells. This structure can be altered if desired, for example, if more load cells are used.

The pin structures 312 and 332 can be identical and may comprise a one piece pin. However, more desirably, with reference to FIGS. 9 and 10, the pin structures (described for structure 312) comprises a first pin section 360 with a first end portion coupled to the load cell and a second end portion 362 inserted into a locking collar 364. In addition, a second pin section 370 has one end portion coupled to the deck mounting framework and the opposite end portion 372 coupled to the locking collar. Although other coupling mechanisms can be used, an exemplary locking collar 364 comprises a machinable-bore, one-piece, clamp-on, coupling from McMaster-Carr. With this particular locking collar, the loosening of set screws 380 allows the end portion 372 to be removed from the locking collar to thereby separate the load cell from the deck. This can be done, for example, to facilitate changing of the load cell or to protect the load cell at times when the load cell is not being used to measure forces.

Although the wind tunnel balance described herein may be used in any suitable wind tunnel, an exemplary wind tunnel is set forth in U.S. Pat. No. 6,820,477, a copy of which is included herewith and forms a portion of this disclosure.

In this disclosure, the terms "a", "an" and "at least one" include one and also more than one of the referenced components. Also, the term "coupled" encompasses direct connections and indirect connection through one or more other components.

Having illustrated and described the principles of our invention with reference to illustrated embodiments, it should be apparent to those of ordinary skill in the art that these embodiments can be modified in arrangement and detail without departing from the inventive principles disclosed herein. We claim all such modifications.

We claim:

1. A wind tunnel vehicle support comprising:
    a bay;
    a frame structure positioned in the bay;
    a vehicle supporting deck carried by the frame structure;
    a plurality of spaced-apart elongated supports, each support comprising respective upper and lower end portions and being coupled at the lower end portion to a lower portion of the frame structure and supported at an upper end portion such that the elongated supports hang the vehicle frame structure and vehicle supporting deck so as to permit movement of the deck in plural directions in response to the application of wind to a vehicle on the deck.

2. A support according to claim 1 wherein the deck is rectangular with four corners, wherein each of the supports is coupled respectively to the frame structure at a location adjacent to and beneath a respective corner of the deck.

3. A support according to claim 1 wherein the deck comprises a longitudinal center line and a transverse center line, wherein the deck is suspended by at least four of said elongated supports, two of said elongated supports being at one side of the longitudinal center line and two of said elongated supports being at the side of the longitudinal center line opposite to said one side, and two of said elongated supports being at one side of the transverse center line and two of said supports being at the other side of the transverse center line opposite said one side of the transverse center line.

4. A support according to claim 1 wherein the elongated supports comprise respective elongated rods.

5. A support according to claim 1 wherein the bay comprises upright walls and wherein the elongated supports are each supported at an upper end portion by a respective wall-mounted support bracket.

6. A support according to claim 5 wherein the bay has a longitudinal axis and wherein there are four of said wall brackets, a first set of two of said wall brackets being mounted to a first wall of said bay at longitudinally spaced apart locations, and a second set of two of said wall brackets being mounted to a second wall of said bay at longitudinally spaced apart locations, the first and second walls of said bay being opposed to one another.

7. A support according to claim 1 wherein said deck is elongated with a longitudinal axis and a transverse axis perpendicular to the longitudinal axis, said frame structure comprising first and second longitudinally spaced apart suspension structures, the first suspension structure being positioned to support a forward portion of the deck and the second structure being positioned to support a rear portion of the deck, wherein the bay comprises first and second opposed wall portions, a first of said elongated supports being coupled at the lower end portion to the first suspension structure at a first location and at the upper end portion to the first wall portion, a second of said elongated supports being coupled at the lower end portion to the first suspension structure at a second location transversely spaced from the first location and at the upper end portion to the second wall portion, a third of said elongated supports being coupled at the lower end portion to the second suspension structure at a third location and at the upper end portion to the first wall portion, a fourth of said elongated supports being coupled at the lower end portion to the second suspension structure at a fourth location transversely spaced from the first location and at the upper end portion to the second wall portion, the first, second, third and fourth elongated supports thereby hanging the suspension structures and the deck at four locations from the first and second wall portions of the bay.

8. A support according to claim 7 wherein the deck is rectangular with four corners and wherein the first, second, third and fourth locations are respectively each positioned at locations beneath a location adjacent to a respective corner of the deck.

9. A support according to claim 8 wherein the deck comprises a deck surface, and the support comprises a deck support structure including transversely extending cross supports positioned at an elevation below the deck surface, and longitudinally extending parallel spaced apart support beams positioned below the cross supports and supporting respective end portions of the cross supports.

10. A support according to claim 9 wherein the first and second suspension structures each comprise transversely spaced apart first and second uprights, each of the first and second uprights having an upper end portion coupled to a respective one of the support beams and a lower end portion, a cross member extending between and coupled to the lower end portions of the first and second uprights, the first location being at a first end portion of the cross member of the first suspension structure, the second location being at a second end portion of the cross member of the first suspension structure, the third location being at a first end portion of the cross member of the second suspension structure, and the fourth location being at a second end portion of the cross member of the second suspension structure.

11. A support according to claim 10 comprising a first, second and third load cells coupled between the bay and the frame structure.

12. A support according to claim 11 wherein each load cell is coupled to a first ball joint, wherein there is a second ball joint coupled to the frame structure, and comprising a connection member coupling the first and second ball joints together.

13. A support according to claim 12 wherein the connection member comprises first and second portions and a collar interconnecting the first and second portions, the collar being operable to allow separation of the first and second portions to decouple a load cell from the frame structure.

14. A support according to claim 11 wherein there are only three load cells used to measure wind forces on a vehicle supported on the deck, two of said load cells extending between one of said first and second wall portions and the frame structure, and the third of said load cells extending between the frame structure and a portion of the bay intermediate to the first and second wall portions.

15. A support according to claim 7 comprising a first, second and third load cells coupled between the bay and the frame structure.

16. A support according to claim 15 wherein each load cell is coupled to a first ball joint, wherein there is a second ball joint coupled to the frame structure, and comprising a connection member coupling the first and second ball joints together.

17. A support according to claim 16 wherein the connection member comprises first and second portions and a connector interconnecting the first and second portions, the connector being operable to allow separation of the first and second portions to decouple the load cell from the frame structure.

18. A support according to claim 15 wherein there are only three load cells used to measure wind forces on a vehicle supported on the deck, two of said load cells extending between one of said first and second wall portions and the frame structure, and the third of said load cells extending between the frame structure and a portion of the bay intermediate to the first and second wall portions.

19. A support according to claim 1 including means for selectively locking the deck against movement.

20. A wind tunnel vehicle support comprising:
a frame structure comprising a vehicle supporting deck portion, and
four elongated spaced apart upright supports, each elongated support comprising upper and lower end portions, the supports being supported at their upper end portions and being coupled at their lower end portions to the frame structure so as to suspend the frame structure at four spaced apart locations such that the deck portion can move in fore to aft and side-to-side directions in response to the application of wind to a vehicle supported by the deck.

21. A support according to claim 19 wherein the elongated supports comprise support or rods.

22. A support according to claim 20 comprising a bay with a wall, the frame structure being suspended in the bay, and comprising first, second and third load cells coupled between the wall of the bay and the frame structure.

23. A support according to claim 22 wherein each load cell is coupled to a first ball joint, wherein there is a second ball joint coupled to the frame structure, and comprising a connection member coupling the first and second ball joints together.

24. A support according to claim 23 wherein the connection member comprises first and second portions and a collar interconnecting the first and second portions, the collar being operable to allow separation of the first and second portions to decouple a load cell from the frame structure.

25. A support according to claim 22 wherein the wall of the bay comprises first and second side wall portions, wherein there are only three load cells used to measure wind forces on a vehicle supported on the deck, two of said load cells extending between one of said first and second side wall portions and the frame structure, and the third of said load cells extending between the frame structure and a portion of the bay intermediate to the first and second wall portions.

26. A support according to claim 20 including means for selectively locking the deck against movement.

27. A wind tunnel vehicle support comprising:
a vehicle supporting deck;
a frame carrying the vehicle supporting deck; and
a four point suspension configured to hang the frame at only four spaced apart locations and to balance the frame such that the frame and deck is movable in plural directions in response to the application of wind in plural directions to a vehicle carried by the deck.

28. A method of supporting a vehicle support in a wind tunnel comprising:
supporting a vehicle support on a frame; and
hanging the frame from only four locations so as to permit the vehicle support to move in fore to aft and side-to-side directions.

* * * * *